United States Patent

[11] 3,581,566

| [72] | Inventors | Goff, Randall<br>Fairfield County, Conn.;<br>Melis, William, Harris County, Tex. |
|---|---|---|
| [21] | Appl. No. | 764,808 |
| [22] | Filed | Oct. 3, 1968 |
| [45] | Patented | June 1, 1971 |
| [73] | Assignees | Dresser Industries, Inc.,<br>Dallas, Tex. |

[54] TEMPERATURE COMPENSATED FLUID METER COUNTER
6 Claims, 3 Drawing Figs.

[52] U.S. Cl. ........................................ 73/229,
          73/233
[51] Int. Cl. ........................................ G01f 3/00
[50] Field of Search............................ 73/233,
          229, 231, 217, 218

[56] References Cited
UNITED STATES PATENTS

| 2,093,151 | 9/1937 | Mac Lean.................. | 73/233 |
| 2,122,529 | 7/1938 | Mac Lean et al. ........ | 73/233 |
| 2,791,118 | 6/1957 | Holtz....................... | 73/233 |
| 3,169,399 | 2/1965 | Allport..................... | 73/233 |

Primary Examiner—James J. Gill
Assistant Examiner—Herbert Goldstein
Attorneys—Robert W. Mayer, Daniel Rubin, Peter J. Murphy, Frank S. Troidl, Roy L. Van Winkle and William E. Johnson, Jr.

ABSTRACT: A bimetallic temperature sensing probe, adapted to be inserted within the thermowell of a positive displacement gas meter, senses the gas temperature, indicating such temperature on a scale. Temperature-induced rotational movement of the bimetallic element positions a cam which varies the ratio between angular rotation of the gas meter output shaft and rotation of the display counter in such a manner as to correct the indicated gas flow to standard conditions. The variable ratio drive imposes an intermittent load on the bimetallic probe assembly, allowing the cam and indicating scale to rotate freely during part of each cycle. The variable ratio drive is accomplished by a crank disc and connecting rod assembly which causes a driving arm to oscillate in an arc upon an idler bearing about a shaft. A driven arm, carrying an overrunning clutch, is driven by the driving arm by an amount whose limits are determined by the cam in one direction and by the duration of the arc of the driving arm in the other direction. The overrunning clutch allows a counter indicative of gas volume to be driven by the movement of the driven arm in the direction away from the cam.

INVENTORS
RANDALL GOFF
WILLIAM MELIS

William E. Johnson Jr.
ATTORNEY

INVENTORS
RANDALL GOFF
WILLIAM MELIS

William E. Johnson Jr.
ATTORNEY

TEMPERATURE COMPENSATED FLUID METER COUNTER

BACKGROUND OF THE INVENTION

The present invention relates to compensating devices for fluid meters, and more particularly, to a device for correcting the indicated volume reading of a positive displacement fluid meter so as to compensate for variations in temperature of the metered fluid.

In fluid meters of the type commonly utilized for the volumetric measurement of gaseous fluids, such as gas meters, the density of the gas, and hence its heating value per unit of volume, varies with changes of temperature of the gas. Consequently, the volume of gas passing through the meter, as recorded on an indicator driven directly by the meter, does not actually indicate what the volume would measure at the standard temperature used for computing the cost of the gas used. Variations in gas density due to temperature changes thus result in under-registration of the meter at low temperatures and over-registration at high temperatures. It is therefore necessary, particularly in the case of large gas-using installations, to provide means for compensating for the effect of temperature variations.

Various devices have been proposed for correcting the readings of gas meters so as to compensate for variations in the temperature of the metered gas. However, certain disadvantages of prior art compensating devices are overcome by the present invention which provides a volume-correcting mechanism for fluid meters which comprises a simple and reliable means for so controlling the drive of the counter means by the meter that the volumetric displacement of the meter is corrected for variations in temperature of a gas from a standard based temperature.

Accordingly, the primary object of the present invention is to provide a new and improved mechanical compensating device for fluid meters which automatically compensate for variations in temperature of the metered fluid, and which causes the meter to register accurately the volume of the fluid used with reference to a predetermined standard or base temperature.

Another object of the invention is to provide a new and improved mechanical compensating device for positive displacement fluid meters which imposes an intermittent load upon the temperature sensing means incorporated therein, thus allowing other portions of the device to rotate freely during part of each cycle.

The objects of this invention are accomplished, generally, by the provision of a temperature compensated counter which is readily adaptable to positive displacement gas meters. Within the counter compensation assembly a temperature sensing means is mounted which is readily adaptable to be in contact with the metered fluid. The rotatable temperature sensing means positions a cam which varies the ratio between angular rotation of the gas meter output shaft and rotation of the display counter in such a manner as to correct the indicated gas flow to standard condition. The variable ratio drive furthermore imposes only an intermittent load upon the temperature sensing means, thus allowing the cam and temperature indicating scale to rotate freely during part of each cycle.

Other objects, features and advantages of the invention will become apparent from the following description of the exemplary mechanical embodiment thereof which is illustrated in the accompanying drawings, wherein like reference characters indicate like parts throughout the several views, and:

Figure 1:
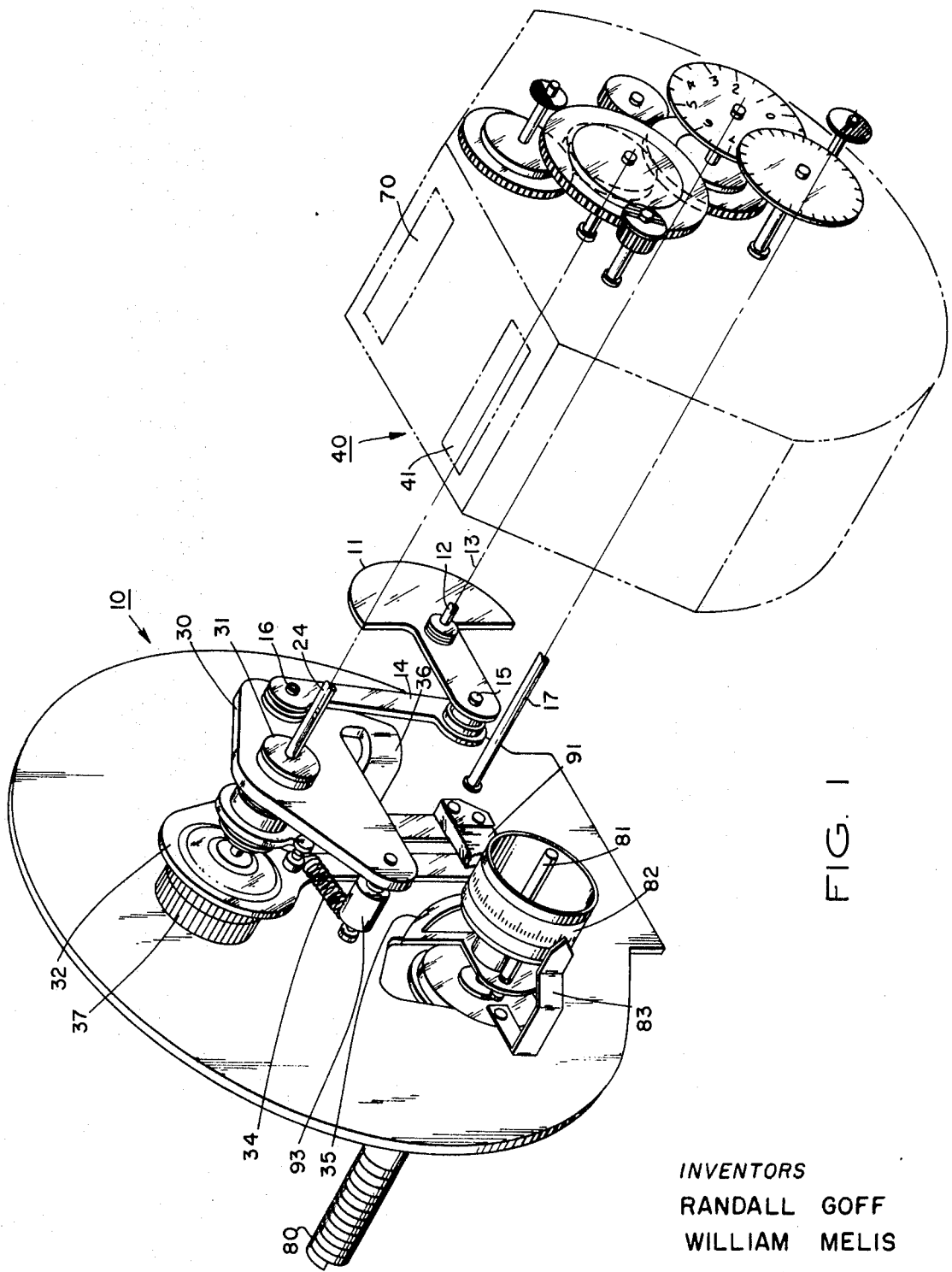
FIG. 1 is a fragmentary pictorial view of one form of the compensation device according to the invention.
Figure 2:
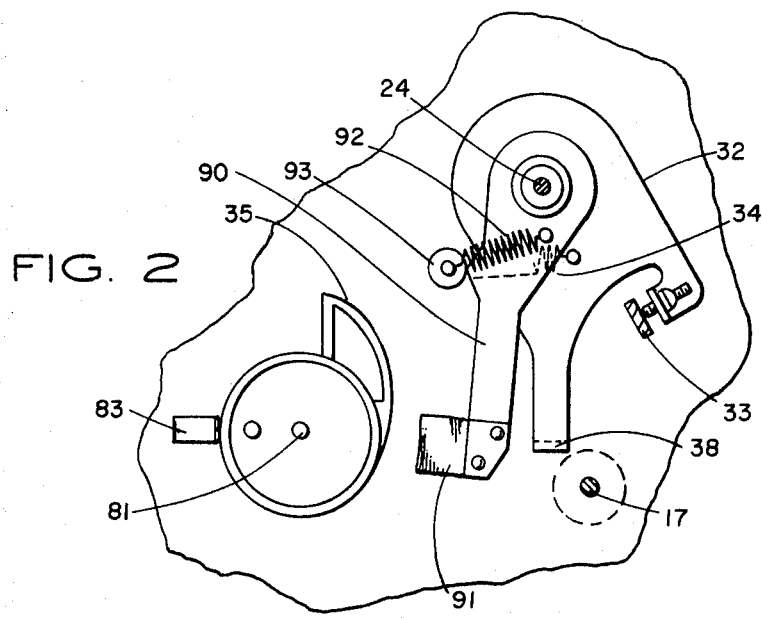
FIG. 2 is a diagrammatic cutaway of the braking and driven arm assemblies according to the invention.

Referring now to the drawings in more detail, especially to FIGS. 1 and 2, the numeral 10 designates generally a compensating or correcting device according to the present invention which is adapted to be self-contained in a conventional fluid meter of the fixed or constant displacement type (not illustrated), for example, a constant displacement gas meter. As illustrated, the device 10 includes a fixed throw eccentric mechanism comprising a disc crank 11 mounted on a rotatable shaft 12 and a connecting rod 14 which is pivotally mounted at its lower end to disc 11 by a pin 15 offset from the axis of the shaft 12. Shaft 12 is suitably arranged to be driven by the output element 17 of a constant displacement meter through a conventional gear train in a manner well known in the art so that its rotational movement is a measure of the amount of gas passing through the meter. The axis of rotation 13 of the disc crank 11 and shaft 12 is maintained stationary so that the length of stroke of rod 14 is always the same. Although not illustrated, the rotation element 17 is magnetically coupled to the meter rotor shaft which isolates the pressurized meter body from the compensated counter assembly according to the invention.

For translating the rotary movement of shaft 12 and disc 11 to the drive mechanism of a compensated register 41 of the counter assembly 40, the upper end of the connecting rod 14 is pivotally connected by a pin 16 to a driving arm 30 which is mounted upon an idler bearing 31 on the counter shaft 24 to thus oscillate in an arc about the shaft 24. A driven arm 32, having an adjustable engaging surface 33, (best illustrated in FIG. 2) is pivoted at one end about the shaft 24 and has a resilient means 34, for example, a spring, which forces the other end 38 of the driven arm 32 against a cam 35 during one portion of the cycle as explained hereinafter.

The driving arm 30 has an L-shaped surface 36 thereon which engages the surface 33 of the driven arm 32 during a portion of the cycle, also explained hereinafter.

In order to actuate the compensated register 41 of the counter 40, the driven arm 32 carries a suitable overriding one-way clutch 37 which is drivably associated with counter shaft 24. This type of overriding clutch is well known in the art and is commercially available from the Taylor and Helander Manufacturing Co. of Clinton, Connecticut.

In the operation of the apparatus above described, it should be appreciated that the driving arm 30 is caused to oscillate in a first arc about the idler bearing 31, the duration of this first arc being constant and having definite end limits. However, the arc of oscillation of the driven arm 32 is less that the arc of oscillation of the driving arm 30, this reduced second arc being limited in one direction by the angle of the cam 35 and in the other direction by the limit of the arc of the driving arm 30. As above mentioned, the driven arm 32 is held against the cam 35 by the resilient means 34 until the L-shaped surface 36 engages the surface 33 and causes the L-shaped portion 38 of the driven arm 32 to be lifted from the cam. As will be explained hereinafter, the cam 35 has an angle which is dependent upon the temperature of the metered fluid and it should be appreciated that by changing the position of the cam 35, the reduced arc of the driven arm 32 is thus varied, hence varying the amount of time that the clutch 37 is engaged to drive the meter register 41. Since the clutch 37 is a one-way clutch, the action of the driven arm being returned back to contact with the cam 35 does not cause the counter shaft 24 to be rotated.

It should be apparent from the description of the apparatus described herein that as the driven arm 32 is caused to oscillate by the driving arm 30, the one-way clutch 37 translates such movement into rotation by the counter shaft 24. While the driven arm 32 is being returned to the cam 35, the clutch slips and the counter shaft 24 remains stationary.

Figure 3:
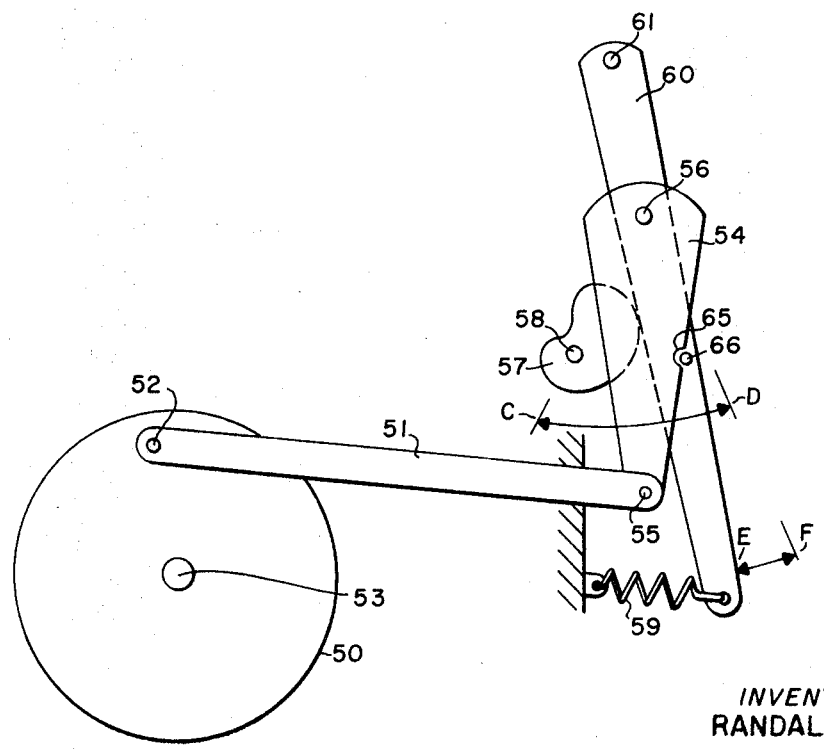
FIG. 3 is a diagrammatic representation of the device according to the invention.

FIG. 3 illustrates schematically the principles of the device according to the present invention wherein a fixed throw eccentric mechanism 50, for example, a crank disc, is adapted to be rotatably driven by a constant displacement fluid meter (not illustrated). A connecting rod 51 is connected to the eccentric mechanism 50 at a point 52 removed from the axis of the rotating shaft 53 which is responsive to the rotation of the fluid meter. The other end of the connecting rod 51 is pivotally connected to one end of a driving arm 54 by the pin 55, the other end of the driving arm 54 being pivoted at a point 56. Thus it should be appreciated that as the eccentric mechanism 50 rotates, the connecting rod 51 causes the driving arm 54 to oscillate through a first arc of a given duration, illustrated by the arc C-D.

A variable angle cam 57, being mounted to rotate about its axis 58 in response to changes in temperature of the metered fluid is mounted so as to form a stop point for the driven arm 60 as explained hereinafter.

The driven arm 60 is pivoted at point 61 at one of its ends and, at its other end, is forced into contact with the cam 57 by the resilient means 59, for example, a spring, except when the driving arm 54 causes the driven arm 60 to be picked up from the cam 57.

The driving arm 54 has a notch 65 to receive the pin 66 from the arm 60 which causes the driven arm 60 to be picked up from the cam 57 during a portion of the arc created by the oscillation of the driving arm 54. In this respect, it should be appreciated that the driven arm 60 only passes through the arc E-F, which is reduced in time from that of the duration of the arc C-D of the driving arm 54. Although not illustrated in FIG. 3, it should be appreciated that the driven arm 60 also carries a one-way clutch, as described with respect to FIG. 1, which causes a counter shaft to rotate and drive a counter index during a one-way portion of the cycle of the arc of the driven arm 60.

There is also provided in the preferred embodiment of the invention an uncompensated counter index 70 (see FIG. 1) which is driven by a reduction gear train to be directly responsive to the rotation of the meter shaft, disregarding any variations in the temperature of the gas. This additional feature of the invention allows an operator, by a comparison of the two counters, i.e., the compensated counter 41 and the uncompensated counter 70, to determine the amount of gas volume differential brought about by temperature variations.

It should be appreciated that, depending upon the geographic location at which the gas meter and counter according to the invention are used, and for various other reasons, the owner or user of the gas meter counter may desire to use different "standard" temperatures. For such reasons, the apparatus according to the present invention is provided with an adjustment screw (not illustrated) to set several base temperatures ranging from 50° F. to 72° F. It should likewise be appreciated that, depending upon the geographic location at which the meter and counter according to the present invention are to be used, one can vary the design of the cam 35 to compensate for temperature variations in a given locality. For example, if the counter and meter are used in an area which has wide temperature extremes, the design of the cam can vary considerably from that used in a climate wherein the temperature extremes vary by only a few degrees.

Those skilled in the art will recognize, of course, that the temperature compensation provided by the device according to the preferred embodiment of the present invention herein illustrated is dependent upon, and can be varied by, the adjustment of the length of the connecting rod, the relationship of the dimensions of the driving and driven arms, the dimensions of the cam, by the selection of the temperature sensing probe, and by the gearing assembly used to drive the counter index during the arc of the driven arm.

Referring further to FIG. 1, there is illustrated a bimetallic temperature sensing probe 80 adapted to be inserted into the metered fluid. The rotation of the probe 80, caused by temperature variations, causes the cam 35 to rotate about the camshaft 81, thus varying the point of contact between the cam 35 and the end 38 of the driven arm 32. A temperature scale 82 is also mounted upon the camshaft 81, a pointer 83 providing a visual monitor of the temperature of the metered fluid.

Also illustrated in FIGS. 1 and 2 is a braking assembly comprising a braking arm 90 having a braking surface 91. A spring 92 is connected between the arm 90 and the member 93 which extends out from the driving arm 30. The braking surface 91, preferably comprising a fiber or rubber material so as not to scratch the temperature scale 82, is so arranged as to come into contact with the temperature scale 82 immediately before the surface 38 comes into contact with the cam 35. The brake is then released immediately after the surface 38 leaves the cam 35. This timing is provided by the action of the spring 92 to pull the brake into contact with the scale 82 and by the member 93 to pull up the brake from the scale, the oscillation of the driving arm 30 performing both timing functions.

Although the braking action is illustrated as being done against the temperature scale 82, it should be appreciated that it could also be done against any other mechanism which would suspend rotation of the camshaft 81.

Since the brake is applied until the beginning of the arc of the driven arm away from the cam, it should be appreciated that the brake duration during each cycle is substantially equal to the difference in time between the durations of the two arcs, i.e., the arcs of the driving arm and the driven arm.

There is thus provided by the present invention a novel, structurally simple mechanism for correcting the counter reading of a positive displacement fluid meter so as to compensate for variations in temperature of the metered fluid with respect to a standard base temperature. There has also been provided within this mechanism a means for placing only intermittent load upon the temperature sensing and cam assembly. Although only the preferred embodiments of the invention have been described and illustrated in the accompanying drawing, it will be apparent to those skilled in the art that the inventive concept is capable of a variety of mechanical modifications. It is therefore intended by the appended claims to cover all such modifications which fall within the true scope of the invention.

The embodiments of the invention in which an exclusive property or privilege is claimed are defined as follows:

We claim:

1. A temperature compensating device for a fluid meter comprising in combination:
   a. temperature sensitive means adapted to be supported in the fluid path of a meter to be compensated for providing winding and unwinding rotational displacement in response to sensed temperature changes;
   b. a cam member mounted for rotation and rotatably coupled to said temperature sensitive means for concomitant rotation therewith, said cam member defining a cam surface radially outward of its rotational axis providing a variable pitch correlated to the rotational displacement of said temperature sensitive means;
   c. an eccentric drive mechanism adapted for actuation by the meter to be compensated;
   d. a pivotally mounted first arm cyclically oscillated by said drive mechanism through forward and rearward strokes of a predetermined angular displacement;
   e. biasing means;
   f. a pivotally mounted second arm cyclically operable through strokes of angular displacement less than that of said first arm, said strokes of said second arm being limited in a forward direction by second arm engagement against said cam surface and being limited in a rearward direction by a corresponding position of said first arm, said second arm being constantly urged in said forward direction toward said cam by said biasing means and being displaced from said cam in a rearward direction in opposition to said biasing means by an operable engagement of said first arm;
   g. a one-way clutch actuatably coupled to said second arm while said second arm is displaced in said rearward direction;
   h. a counter index operably responsive to actuation of said clutch; and
   i. brake means operative to arrest said cam member against rotational movement at least while said cam surface is being engaged by said second arm.

2. A temperature compensating device for a fluid meter according to claim 1 in which said temperature sensing means comprises a helically wound bimetallic coil.

3. A temperature compensating device for a fluid meter according to claim 1 in which said brake means comprises a first braking member rotatably coupled to said cam member and a second braking member operably associated with said first arm for contacting said first braking member in a braking engagement.

4. A temperature compensating device for a fluid meter according to claim 3 in which said first and second braking members have mutually parallel surfaces which contact for effecting said braking engagement.

5. A temperature compensating device for a fluid meter according to claim 4 in which said second braking member is secured to a third arm pivotally mounted and operable concomitantly with said second arm to effect said braking engagement in advance of said second arm engaging said cam member and to effect braking disengagement following second arm displacement from said cam.

6. A temperature compensating device for a fluid meter according to claim 5 including second biasing means urging said third arm in said forward direction toward said first braking member to effect said braking engagement and means associated with said first arm acting against said third arm in opposition to said second biasing means to displace said third arm in a rearward direction for effecting said braking disengagement.